Patented Feb. 2, 1943

2,310,167

UNITED STATES PATENT OFFICE 2,310,167

PROCESS FOR SYNTHESIZING VITAMIN B$_6$

Gustaf H. Carlson, Pearl River, N. Y., assignor to Lederle Laboratories, Inc., New York, N. Y., a corporation of Delaware No Drawing. Application September 26, 1941, Serial No. 412,427

18 Claims. (Cl. 260—297)

This invention relates to synthetic methods of preparing vitamins and more particularly relates to an improved process for the preparation of vitamin B$_6$ and to new intermediates employed in the process.

In accordance with the present invention, I have discovered that vitamin B$_6$ may be synthesized by a series of steps which comprises reacting an ester of 3-cyano-4-carboxy-6-methyl pyridone-2 with ammonia to form the amide of 3-cyano-4-carboxy-6-methyl pyridone-2 which is dehydrated to 3,4-dicyano-6-methyl pyridone-2, and this product nitrated to form the compound 3,4-dicyano-5-nitro-6-methyl pyridone-2, which, by halogenation, is converted to 2-halo-3,4-dicyano-5-nitro-6-methyl pyridin. This latter compound is partially reduced to give 2-halo-3,4-dicyano-5-amino-6-methyl pyridin and this amino derivative is then subjected to a more complete reduction step to form 3,4-aminomethyl-5-amino-6-methyl pyridine which, when subjected to a deamination treatment (replacement of —NH$_2$ by —OH), gives vitamin B$_6$ (3,4-hydroxymethyl-5-oxy-6-methyl pyridin).

The reactions which take place in the above steps may be represented as follows:

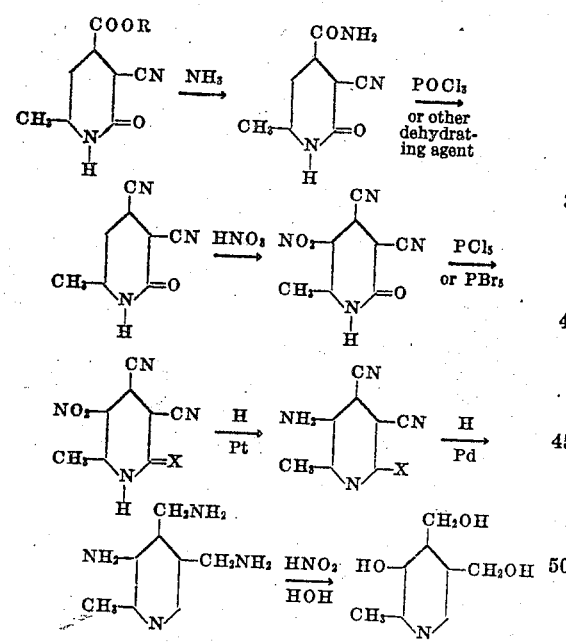

in which R represents radicals such as alkyl, aryl, aralkyl, or heterocyclic and X represents bromine or chlorine.

It is an advantage of the present invention that the reagents are less expensive than the reagents employed in the long and involved process described in the literature for the preparation of vitamin B$_6$. It is also an advantage of this invention that a process is provided which gives a good over-all yield of vitamin B$_6$.

My improved process for producing vitamin B$_6$ will be more fully illustrated in conjunction with the following specific examples. It should be understood, however, that the examples are given merely by way of illustration and the invention is not to be limited by the exact details set forth therein.

Preparation of the amide of 3-cyano-4-carboxy-6-methyl pyridone-2

Two hundred grams of the ethyl ester of 3-cyano-4-carboxy-6-methyl pyridone-2 (prepared according to the method described by Bardhan, J. C. S. 2223 (1929)) were added to 3.5 liters of absolute methanol saturated at 0° C. with gaseous ammonia and, after 7 days at 0° C., the filtered solution was concentrated in vacuo to a small volume to give the amide of 3-cyano-4-carboxy-6-methyl pyridone-2, which melted above 300° C. with decomposition. The compound so prepared is useful as an intermediate in the synthesis of vitamin B$_6$.

In the foregoing specific example the ethyl ester of 3-cyano-4-carboxy-6-methyl pyridone-2 was employed in carrying out the reaction and is the preferred ester because of its cheapness and availability. It should be understood, however, that the ethyl ester may be replaced by other suitable esters of 3-cyano-4-carboxy-6-methyl pyridone-2. Among the various esters that may be employed are the alkyl esters such as methyl, propyl, amyl, hexyl, and the like. The aromatic esters, such as phenyl and naphthyl, may similarly be employed. Esters of the aralkyl type which may be satisfactory are those such as the benzyl ester and the ester of 2-hydroxymethylnaphthalene, cinnamyl alcohol, etc. The esters derived from cycloaliphatic alcohols such as cyclohexanol, methyl cyclohexanol, fenchol, and the like, may be employed. The use of various other esters such as those derived from heterocyclic alcohols, for example furfuryl alcohol, tetrahydrofurfuryl alcohol or those derived from nitro alcohols such as 2-nitro-2-methyl-1-propanol are not precluded from the present invention.

Preparation of 3,4-dicyano-6-methyl pyridone-2

Dehydration of the amide of 3-cyano-4-carboxy-6-methyl pyridone-2 was effected by treatment with phosphorous oxychloride, both without the use of a solvent and in hot toluene solution. The details of a typical experiment in which no solvent was used are given herewith. The amide (2 g.) and 25 cc. of phosphorous oxychloride were heated in a bath at 145–150° C. for 50 minutes, excess phosphorous oxychloride was distilled in vacuo and the residue was treated with 50 g. of cracked ice. The crystalline product was filtered off and recrystallized from aqueous alcohol. The pure dinitrile (0.4 g.) melted at 241–243° C. (uncorrected).

In subsequent experiments it was found to be advantageous to employ an inert diluent in the reaction mixture and typical of such a dehydration are the following details. A mechanically stirred mixture of 50 g. of the amide, 250 cc. of dry toluene and 250 cc. of phosphorous oxychloride was heated in a bath at 130–133° C. for 9.5 hours and, after 15 hours at room temperature, the undissolved material was filtered off and thoroughly extracted with toluene and ether. The solid was then extracted with acetone and yielded 8.9 g. of unchanged amide. The original toluene filtrate and the combined toluene and ether extracts were evaporated in vacuo and the residual product was treated with 20 cc. of ice water. The crude yellow mixture was diluted with 800 cc. of hot acetone, the insoluble product was filtered off, twice extracted with 300 cc. of hot acetone, and yielded 11.3 g. of recovered amide. The aqueous acetone filtrate and the combined acetone extracts were concentrated in vacuo to a small volume and yielded 13.4 g. of the crude dinitrile (M. P. 239–243° C.) which melted at 241–242° C. after recrystallization (melting points uncorrected).

Phosphorous oxychloride is the preferred dehydrating reagent in carrying out the above reaction. It should be understood, however, that any other suitable dehydrating agent may be employed. Similarly, various other inert solvents may be used to replace toluene.

Preparation of 3,4-dicyano-5-nitro-6-methyl pyridone-2

A suspension of 3,4-dicyano-6-methyl pyridone-2 (3.8 g.) in 20 cc. of acetic anhydride was treated at 45–52° C. with a solution prepared from 3 cc. of fuming nitric acid, 3 cc. of acetic anhydride and a few crystals of urea. The resulting solution was poured onto cracked ice and yielded 2.6 g. of the crude nitro compound. The solid was dissolved in 75 cc. of acetone, the solution was treated with active charcoal and the filtered solution was concentrated in vacuo to a small volume. The solution was rapidly diluted with ether and the precipitated product was recrystallized from an acetone-ether solution. The pure nitro derivative (1.6 g.) which was obtained had a melting point of 242–244° C. uncorrected.

Preparation of 2-chloro-3,4-dicyano-5-nitro-6-methyl pyridin

A mixture of 7.5 g. of phosphorous pentachloride, 50 cc. of chlorobenzene and 5.9 g. of 3,4-dicyano-5-nitro-6-methyl pyridone-2 were heated in a bath at 135° C. for 2 hours, solvent was distilled in vacuo and the residue was extracted with ether. The extract was treated with activated charcoal, the filtered solution was concentrated in vacuo to a small volume and, on addition of petroleum ether, yielded 5.4 g. of the crude chloro compound. After recrystallization, 4.3 g. of the pure product was obtained which melted at 86–86.5° C. uncorrected.

I prefer to use phosphorous pentachloride for halogenating the pyridone, but it should be understood, that other suitable halogenating reagents may be used instead, for example phosphorous pentabromide. Similarly, the 2-chloro compound is the preferred intermediate for use in the synthesis of vitamin $B_6$ since it is somewhat cheaper and more easily handled than the corresponding 2-bromo derivative. It should be understood, however, that the 2-bromo compound may be satisfactorily used to replace the 2-chloro compound in the synthesis of vitamin $B_6$.

Preparation of 2-chloro-3,4-dicyano-5-amino-6-methyl pyridin

A solution of 1 g. of 2-chloro-3,4-dicyano-5-nitro-6-methyl pyridin in 75 cc. of acetic anhydride was reduced catalytically in the usual manner (0.1 g. of platinum oxide used as catalyst) and absorbed 390 cc. of hydrogen during 160 minutes. The catalyst was filtered off, solvent was distilled in vacuo, the residue was washed with acetone and recrystallized from aqueous acetone. The resulting, slightly impure amine was recrystallized from acetic acid containing hydrogen chloride and then melted at 221–222° C.

The reduction may be carried out using other suitable hydrogenating catalysts instead of platinum oxide. The reduction is preferably carried out catalytically. It should be understood, however, that other known reduction methods may be employed. Suitable reduction methods include reduction with metals and acid as well as the usual alkaline reductions well known and used in the art for reduction of nitro groups.

The 2-chloro-3,4-dicyano-5-nitro-6-methyl pyridin used as the starting material in the above reduction may be replaced by the corresponding 2-bromo compound to result in the production of 2-bromo-3,4-dicyano-5-amino-6-methyl pyridin.

Preparation of 3,4-aminomethyl-5-amino-6-methyl pyridin trihydrochloride

A solution of 2-chloro-3,4-dicyano-5-amino-6-methyl pyridin (0.75 g.) and 0.75 g. of hydrogen chloride in 112.5 cc. of methanol containing 10% of water was added gradually, during 16.5 hours, to a mechanically agitated suspension of 3 g. of palladium chloride in 75 cc. of 90% methanol (previously reduced in the usual manner with hydrogen), and absorbed 550 cc. of hydrogen at 30° C. Sufficient water was added to dissolve the precipitated product, the solution was filtered and the filtrate was diluted with an equal volume of ether. The crystalline salt was washed with absolute methanol and yielded the trihydrochloride.

The trihydrobromide may be obtained by using hydrogen bromide to replace hydrogen chloride in the above example.

The free base, 3,4-aminomethyl-6-methyl pyridin, may be liberated from the hydrogen halides in the usual manner.

Preparation of 3,4-hydroxymethyl-5-oxy-6-methyl pyridin ($B_6$)

A solution of 0.3 g. of 3,4-aminomethyl-5-amino-6-methyl pyridin trihydrochloride in 5 cc. of water was added simultaneously with a solution of 0.68 g. of sodium nitrite in 5 cc. of water to 50 cc. of hot 2.5 N hydrochloric acid. When evolution of gas ceased, the product was evaporated to dryness in vacuo and the residue was extracted three times with acetone. The practically colorless residue was then repeatedly extracted with hot ethanol, the combined ethanol extracts were concentrated in vacuo to a small volume and the solution was diluted with acetone. During 15 hours at 5° C. the solution deposited a white crystalline compound, M. P. 201–202° C. uncorrected, which did not depress the melting point of an authentic specimen of vitamin B$_6$ (pyridoxin) and conformed in all essentials with the properties of the known compound.

The term "deamination" as used in the specification and claims refers to the replacement of a —NH$_2$ group by a —OH group.

In the deamination step described above the trihydrobromide may be used, the hydrochloride being preferred because of cheapness and ease of preparation. Similarly, the sodium nitrite may be replaced by other suitable nitrites such as for example potassium nitrite and the reaction may also be effected by using amyl nitrite in the usual way.

I claim:

1. In the process of preparing vitamin B$_6$, the step which comprises reacting an ester of 3-cyano-4-carboxy-6-methyl pyridone-2 with ammonia to form the amide of 3-cyano-4-carboxy-6-methyl pyridone-2.

2. In the process of preparing vitamin B$_6$, the step which comprises dehydrating the amide of 3-cyano-4-carboxy-6-methyl pyridone-2 to form 3,4-dicyano-6-methyl pyridone-2.

3. In the process of preparing vitamin B$_6$, the step which comprises nitration of 3,4-dicyano-6-methyl pyridone-2 to form 3,4-dicyano-5-nitro-6-methyl pyridone-2.

4. In the process of preparing vitamin B$_6$, the step which comprises halogenating 3,4-dicyano-5-nitro-6-methyl pyridone-2 with a halogenating substance of the group consisting of chlorinating and brominating reagents to form 2-halo-3,4-dicyano-5-nitro-6-methyl pyridin.

5. In the process of preparing vitamin B$_6$, the step which comprises treating 3,4-dicyano-5-nitro-6-methyl pyridone-2 with phosphorus pentachloride to form 2-chloro-3,4-dicyano-5-nitro-6-methyl pyridin.

6. In the process of preparing vitamin B$_6$, the step which comprises reducing the nitro substituent of a substance of the group consisting of 2-chloro-3,4-dicyano-5-nitro-6-methyl pyridin and 2-bromo-3,4-dicyano-5-nitro-6-methyl pyridin to form 2-halo-3,4-dicyano-5-amino-6-methyl pyridin.

7. In the process of preparing vitamin B$_6$, the step which comprises reducing 2-chloro-3,4-dicyano-5-nitro-6-methyl pyridin to form 2-chloro-3,4-dicyano-5-amino-6-methyl pyridin.

8. In the process of preparing vitamin B$_6$, the step which comprises reduction of a substance of the group consisting of 2-chloro-3,4-dicyano-5-amino-6-methyl pyridin and 2-bromo-3,4-dicyano-5-amino-6-methyl pyridin to form a 3,4-aminomethyl-5-amino-6-methyl pyridin.

9. In the process of preparing vitamin B$_6$, the step which comprises reduction of 2-chloro-3,4-dicyano-5-amino-6-methyl pyridin to form 3,4-aminomethyl-5-amino-6-methyl pyridin.

10. In the process of preparing vitamin B$_6$, the step which comprises deamination of 3,4-aminomethyl-5-amino-6-methyl pyridin trihydrohalides of the group consisting of the trihydrochloride and the trihydrobromide to form vitamin B$_6$.

11. In the process of preparing vitamin B$_6$, the step which comprises deamination of 3,4-aminomethyl-5-amino-6-methyl pyridin trihydrochloride to form vitamin B$_6$.

12. In the process of preparing vitamin B$_6$, the steps which comprise reacting an ester of 3-cyano-4-carboxy-6-methyl pyridone-2 with ammonia to form the amide of 3-cyano-4-carboxy-6-methyl pyridone-2, dehydrating the latter to give 3,4-dicyano-6-methyl pyridone-2, nitrating to form 3,4-dicyano-5-nitro-6-methyl pyridone-2, halogenating the latter to form 2-halo-3,4-dicyano-5-nitro-6-methyl pyridin, reducing the nitro group to give 2-halo-3,4-dicyano-5-amino-6-methyl pyridin, reducing the cyano groups to form 3,4-aminomethyl-5-amino-6-methyl pyridin and deaminating to form vitamin B$_6$.

13. In the process of preparing vitamin B$_6$, the steps which comprise reacting the ethyl ester of 3-cyano-4-carboxy-6-methyl pyridone-2 with ammonia to form the amide of 3-cyano-4-carboxy-6-methyl pyridone-2, dehydrating the latter to give 3,4-dicyano-6-methyl pyridone-2, nitrating to form 3,4-dicyano-5-nitro-6-methyl pyridone-2, chlorinating the latter to form 2-chloro-3,4-dicyano-5-nitro-6-methyl pyridin, reducing the nitro group to give 2-chloro-3,4-dicyano-5-amino-6-methyl pyridin, reducing the cyano groups to form 3,4-aminomethyl-5-amino-6-methyl pyridin trihydrochloride and deaminating the trihydrochloride to form vitamin B$_6$.

14. In the process of preparing vitamin B$_6$, the steps which comprise reacting the ethyl ester of 3-cyano-4-carboxy-6-methyl pyridone-2 with ammonia to form the amide of 3-cyano-4-carboxy-6-methyl pyridone-2, dehydrating the latter to give 3,4-dicyano-6-methyl pyridone-2, nitrating to form 3,4-dicyano-5-nitro-6-methyl pyridone-2, brominating the latter to form 2-bromo-3,4-dicyano-5-nitro-6-methyl pyridin, reducing the nitro group to give 2-bromo-3,4-dicyano-5-amino-6-methyl pyridin, reducing the cyano groups to form 3,4-aminomethyl-5-amino-6-methyl pyridin trihydrochloride, and deaminating the trihydrochloride to form vitamin B$_6$.

15. The compounds of the group consisting of 3,4-aminomethyl-5-amino-6-methyl pyridin and acid addition salts thereof.

16. The compound of the formula:

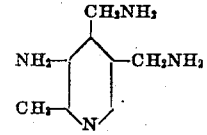

17. The compound 3,4-aminomethyl-5-amino-6-methyl pyridin trihydrochloride.

18. The compound 3,4-aminomethyl-5-amino-6-methyl pyridin trihydrobromide.

GUSTAF H. CARLSON.